United States Patent Office 3,563,962
Patented Feb. 16, 1971

3,563,962
RUBBER VULCANIZATION AGENTS AND METHODS FOR THEIR PREPARATION
Stanley B. Mirviss, Stamford, Conn., assignor to Stauffer Chemical Company, New York, N.Y., a corporation of Delaware
No Drawing. Filed Dec. 13, 1967, Ser. No. 690,062
Int. Cl. C08f 27/06
U.S. Cl. 260—79  7 Claims

ABSTRACT OF THE DISCLOSURE

Superior vulcanization agents for rubber are prepared by heating conjugated diolefins with sulfur in the presence of catalytic amounts of phosphorus sulfides.

BACKGROUND OF THE INVENTION

This invention relates to novel vulcanization agents for rubber and methods for their preparation, and also to the resulting vulcanizates which comprise a major proportion of rubber and a minor proportion of these agents. More particularly, the invention concerns a novel process for the preparation of rubber curing agents which permit slower vulcanization and provide rubbers having improved (i.e. very low) bloom and good scorch values without adversely affecting cure indices.

SUMMARY OF THE INVENTION

The new method of this invention in its broader aspects comprises heating together at a temperature of from about 100° to about 250° C. between about 3 and about 50 parts by weight of sulfur and one part by weight of certain diolefins, in the presence of a catalytic amount, up to about 10% by weight of the mixture, of a phosphorus sulfide. The vulcanizing agent thus obtained may be isolated from the system or, preferably, the entire reaction product may be combined in situ with either natural or synthetic rubber and subjected to standard cure conditions to obtain novel low-bloom vulcanizates. In these products the phosphorus sulfide is a key component. It is not just a catalyst for the preparation of the curing agent, i.e. the copolymer of diolefin and sulfur. It is also a catalyst, or co-curing agent, with the copolymer in making the ultimate vulcanizate. The copolymer is a sulfur donor source for making the crosslinks, i.e. for the vulcanization.

DETAILED DESCRIPTION OF THE INVENTION

As hereinbefore indicated, the useful temperature range is generally from about 100° to 250° C. Below 100° C. there may be insufficient reaction and above 250° C. too many side reactions may occur. Obviously the particular temperature chosen is interdependent with the time of heating, and the time:temperature relationship for any particular reaction system can be readily determined by those skilled in this art. Similarly, the precise quantity of the phosphorus sulfide catalyst or co-curing agent will depend upon the choices and relative proportions of sulfur and diolefin in conjunction with the times and temperatures of heating which are desired to effect the interpolymerization. Generally, no more than about 10% of the sulfide by weight of the reaction mixture is necessary. Preferably somewhere between about 0.2 and 5% of the sulfide by total weight, reaction temperatures substantially between 150° and 230° C. and ratios of about 5 to 45 parts by weight of sulfur per part of diolefin are employed. Elemental sulfur is the preferred form of this component of the interpolymers. The polymerization may be carried out with or without inert diluents. If a diluent is used, it is preferably one that is easily removed later, such as benzene, heptane, carbon tetrachloride, toluene and the like.

The most useful diolefins are those which are cyclic conjugated compounds, such as cyclopentadiene, dimethylcyclopentadiene, cyclohexadiene-1,3, cyclooctadiene-1,3 and 1-vinylcyclohexene. For some reason the process of this invention provides no adavntageous changes in properties when applied to isoprenes and similar linear diolefins. As will be apparent to those skilled in the art, other cyclic olefins can also be selected which, while not themselves conjugated, will crack to form a conjugated diolefin under the particular heating conditions employed. For instance, one of the preferred reactants of this invention is the dimer of cyclopentadiene, i.e. dicyclopentadiene, which on heating above about 100° C. cracks to form cyclopentadiene which then reacts with the sulfur.

The phosphorus sulfide may be chosen from any of the well-known compounds of this class, for instance $P_2S_5$, $P_4S_3$, $P_4S_5$, $P_4S_7$, $P_4S_{10}$ ($P_2S_5$) and $P_4O_6S_4$. Particularly preferred by reason of their relative availability, cost and efficiency are phosphorus sesquisulfide ($P_4S_3$) and phosphorus pentasulfide ($P_2S_5$).

The curing agents prepared by the new process comprise interpolymers of an entirely different class from those heretofore known. They range from brown viscous oils to horny resins, depending upon the relative proportions of sulfur and diolefin. Of course the solid resins must flow when incorporated into the rubber. Either natural or synthetic rubbers are advantageously vulcanized by conventional curing techniques utilizing minor proportions of the new curing agents. Rubbery materials in the vulcanization of which these curing agents are particularly useful are styrene-butadiene rubber (SBR), polybutadiene, polyisoprene (synthetic), natural rubber, and other polydiolefin or poly-olefin-diolefin copolymer rubbers. To these rubbers are generally added proportions of curing agent ranging from approximately 0.25 to 10 parts per one hundred parts by weight of rubber, and preferably from about 1.0 to 6.0 p.p.h. Vulcanization times and temperatures as well as other conditions are generally those well known in the art and of course depend on the type of rubber and its intended use.

The vulcanizates resulting from the use of these curing agents comprise broadly a major proportion of the rubbery material and from about 0.25 to 10 parts per hundred parts by weight thereof of the sulfur:diolefin interpolymer containing the phosphorus sulfide. As previously indicated, this type of interpolymer is a novel one. Of course, curing agents consisting of olefins or diolefins and sulfur are known in the prior art. For instance, U.S. Pat. No. 2,989,513 teaches them. However, it claims only olefins and there is no mention of phosphorus sulfides which are the key ingredients of the interpolymers of this invention. When representative curing agents taught by the patentees are compared with the agents of this invention, it is found that the presence of the $P_2S_5$ or $P_4S_3$ or other sulfide markedly improves scorch values and provides very low bloom without substantially altering cure index. Thus, the phosphorus sulfide clearly plays a unique role in the vulcanization as well as probably a role in the prior reaction between the sulfur and the diolefins.

The following examples are given to illustrate this invention but not in any way to limit its scope.

Note: In these examples "SBR" denotes styrene-butadiene rubber; "MBT" is mercaptobenzothiazole; and "DPG" is diphenylguanidine. The scorch, cure and bloom data reported were obtained by standard test methods. The vulcanizates were prepared in each instance by milling together the rubber stock, the particular curing agent under study and other conventional ingredients, and curing the resulting blend at about 292° F. for 30 minutes.

EXAMPLE I

One hundred ninety-two grams of elemental sulfur and 40.5 grams of dimethylcyclopentadiene (molar proportions of 24:1) were heated together for 5½ hours in a conventional autoclave bomb at about 150° C. (skin temperature) and 135° C. (internal temperature) and then slowly cooled. The bomb was opened and the brown, solid polymer removed. This polymer was designated "Control."

The same quantities of sulfur and dimethylcyclopentadiene were again mixed in the reaction bomb and this time 2.5 grams (about 1% by weight) of phosphorus sesquisulfide ($P_4S_3$) were added. The reaction was carried out for 5½ hours. The skin temperature reached the 146–158° C. range within 15 minutes and remained in that range for the duration of the heating operation. The internal temperature rose rapidly to 120° C. in the first half hour, peaked to 146° C. and then dropped gradually over the next hour to 130–140° C. where it remained for the duration of the heating cycle. The bomb was then cooled and opened, and the dark-brown to black polymer scraped out.

The Control polymer was used to prepare a vulcanizate by mixing 10 parts by weight of it with 588 parts of a rubber masterbatch, 2.4 parts MBT and 1.6 parts DPG. The masterbatch consisted of 1080 grams SBR:32 grams zinc oxide:16 grams stearic acid:8 grams phenolic antioxidant ("Agerite Stalite S"). The $P_4S_3$-containing polymer was used to prepare a second vulcanizate by admixing 10 parts by weight of it, 588 parts of the same rubber masterbatch, 2.4 parts MBT and 1.6 parts DPG.

The comparative test results on these two vulcanizates are given below. They clearly demonstrate the markedly improved scorch, delayed cure and bloom characteristics achieved when the new interpolymer of this invention was employed as the vulcanizing agent.

| | Scorch | Cure | Cure index | Bloom |
|---|---|---|---|---|
| Sample: | | | | |
| Control | 16 | 20 | 4 | 10 days |
| With $P_4S_3$ | 28 | 33 | 5 | > 30 days |

When the same proportions of sulfur, isoprene and $P_4S_3$ were mixed, reacted, and tested under the same conditions, in comparison with a control polymer containing none of the phosphorus sulfide, it was found that the presence of the phosphorus compound gave no advantages.

EXAMPLE II

A 24:1 molar ratio of sulfur to diolefin was obtained by mixing together 192 grams of sulfur and 33 grams of dicyclopentadiene. This mixture was reacted in the autoclave for 5½ hours under substantially the conditions of Example I and the polymer product recovered. The same quantities of the cyclopentadiene dimer and sulfur were again reacted under the same conditions for 5½ hours but this time in the presence of 2 grams of phosphorus pentasulfide catalyst ($P_2S_5$), and the interpolymer thus produced was recovered, too.

Two vulcanizates were prepared using respectively 10 parts by weight of each of these products, 620 parts of rubber masterbatch, 2.4 parts MBT and 1.6 parts DPG. This masterbatch consisted of equal parts by weight of SBR and #1 Pale Crepe (natural rubber), 40% of carbon black by weight of the mixed rubbers, 8% of an oil softener and extender ("Circosol 4240"), 4% zinc oxide, 2% stearic acid and 1% of an antioxidant. Test results like those of Example I were obtained, i.e. more than three times slower bloom and much slower scorch and good delayed cure times were exhibited by the vulcanizate prepared from the phosphorus sulfide—catalyzed interpolymers.

EXAMPLE III

By the procedures of Examples I and II, a mixture of 12 moles of sulfur and 1 mole of cyclohexadiene-1,3 monomer is heated for 5 hours at 150° C. in a bomb in the presence of 5% of $P_4S_3$. The product is used to cure a polybutadiene rubber in the manner described in Example I with the same beneficial results.

EXAMPLE IV

Again the procedures of Examples I and II carried out, using one part by weight of dimethyldicyclopentadiene and 40 parts by weight of sulfur and heating at 230° C. for 3 hours in the presence of 0.2% by weight of $P_4S_7$. The product is used to cure a 50% natural rubber, 50% SBR mixture in a masterbatch similar to that of Example II. A vulcanizate results having improved physical properties when compared to a vulcanizate prepared from the same masterbatch and the diene-sulfur product made without the phosphorus sulfide. A similarly good product is obtained by substituting 0.5% of $P_4S_5$ for the $P_4S_7$.

What is claimed is:

1. The method of preparing a vulcanizing agent for natural and synthetic rubbers which comprises heating together at a temperature of from about 100° to about 250° C. between about 3 and about 50 parts by weight of sulfur and one part by weight of a cyclic conjugated diolefin selected from the group consisting of cyclopentadiene, dimethyl cyclopentadiene, cyclohexadiene-1,3, cyclooctadiene-1,3, and 1-vinylcyclohexene, in the presence of a catalytic amount, up to about 10% by weight of the mixture, of a phosphorus sulfide.

2. The method of claim 1 wherein the diolefin is dimethylcyclopentadiene.

3. The method of claim 1 wherein the diolefin is cyclopentadiene.

4. The method of claim 1 wherein the sulfide is phosphorus pentasulfide.

5. The method of claim 1 wherein the sulfide is phosphorus sesquisulfide.

6. The method of claim 1 wherein between about 5 and 45 parts by weight of elemental sulfur per part of diolefin and between about 0.2 and 5.0% by total weight of phosphorus pentasulfide or phosphorus sesquisulfide or both are used and the mixture is heated to from about 150° to 230° C.

7. The phosphorus sulfide-containing interpolymer prepared by the process of claim 1.

References Cited

UNITED STATES PATENTS

| 2,786,829 | 3/1957 | Stevens | 260—139 |
| 2,989,513 | 6/1961 | Hendry | 260—79 |
| 3,264,239 | 8/1966 | Rosen | 260—23.7 |

JOSEPH L. SCHOFER, Primary Examiner

C. A. HENDERSON, Jr., Assistant Examiner

U.S. Cl. X.R.

260—5, 79.5, 139, 607, 775, 785, 894